United States Patent Office 3,332,928
Patented July 25, 1967

3,332,928
PROCESS AND CATALYST FOR PRODUCTION OF
RUBBERY POLYMERS
Ralph C. Farrar, Bartlesville, Okla., assignor to Phillips
Petroleum Company, a corporation of Delaware
No Drawing. Filed Dec. 3, 1962, Ser. No. 241,492
14 Claims. (Cl. 260—94.3)

This invention relates to catalyst systems for use in the polymerization of 1,3-butadiene. In one aspect, it relates to a process for polymerizing 1,3-butadiene so as to obtain a rubbery polymer. In another aspect, the invention relates to a process for producing a high cis 1,4-polybutadiene.

Numerous methods are described in the literature for polymerizing 1,3-butadiene, including emulsion polymerization, alkali metal catalyzed polymerization, and alfin-catalyzed polymerization. The polybutadiene products produced by these processes contain varying amounts of cis 1,4-addition, trans 1,4-addition and 1,2-addition. However, until quite recently, no polymer of butadiene had been produced which contained more than about 50 percent cis 1,4-configuration. It has now been discovered that a polybutadiene containing at least 85 percent cis 1,4-addition can be produced by polymerizing 1,3-butadiene with the catalyst formed by mixing certain organometals, such as a trialkylaluminum, with an iodine-containing component, such at titanium tetraiodide or a mixture of a titanium chloride or bromide and elemental iodine. The present invention is concerned with an improved process for producing a polybutadiene containing a high percentage of cis 1,4-addition.

It is an object of this invention to provide a novel process for producing a rubbery polymer of 1,3-butadiene.

Another object of the invention is to provide a process for polymerizing 1,3-butadiene in which the rubbery polymer produced contains a high percentage, e.g., from 90 to 98 percent and higher, of cis 1,4-addition.

A further object of the invention is to provide a novel catalyst system for use in the preparation of a polybutadiene having a high cis 1,4-content.

Other and further objects and advantages of the invention will become apparent to those skilled in the art upon consideration of the accompanying disclosure.

Broadly speaking, the process of this invention comprises the step of contacting 1,3-butadiene with a catalyst formed by mixing materials comprising (a) an organomagnesium or organoaluminum compound, (b) titanium tetrachloride or tetrabromide, and (c) the mixture obtained by mixing an organometal hydride and elemental iodine. As mentioned above, it has previously been suggested to polymerize 1,3-butadiene with a catalyst formed by mixing an organometal, a titanium chloride or bromide and free iodine. When using this catalyst system, only about one-half of the iodine charged functions as an active component in the polymerization. However, it has now been discovered that a substantial increase in the efficiency of the iodine is obtained when the iodine is reacted with an organometal hydride and the resulting reaction product is employed as described herein is preparing the catalyst. For example, if two runs are conducted using the same iodine level, one according to the present process and the other according to the conventional procedure, the polymerization rate is faster in the system in which the organometal hydride-iodine reaction product is employed. It has also been found that the present process requires only about one half the iodine level that is needed in the conventional procedure for accomplishing the same result. The present process provides, therefore, an important economic advantage over the conventional process.

The organomagnesium and organoaluminum compounds employed in preparing the present catalyst system can be represented by the formula $R_xM$, wherein R is alkyl, cycloalkyl, aryl, or combinations of these radicals, such as cycloalkylalkyl, aralkyl, alkylcycloalkyl, arylcycloalkyl, alkaryl and cycloalkylaryl, M is magnesium or aluminum, and $x$ is an integer equal to the valence of the metal M. Each R group in the formula preferably contains from 1 to 20, inclusive, carbon atoms. Examples of $R_xM$ compounds suitable for use in preparing the present catalyst system include dimethylmagnesium,
diethylmagnesium
di-n-propylmagnesium,
di-tert-butylmagnesium,
di-n-hexylmagnesium,
didecylmagnesium,
didodecylmagnesium,
dieicosylmagnesium,
dicyclohexylmagnesium,
di-4-methylcyclohexylmagnesium,
dibenzylmagnesium,
di(4-phenyl-n-butyl)magnesium,
diphenylmagnesium,
di-1-naphthylmagnesium,
di-4-tolylmagnesium,
di(2,4-diethylphenyl)magnesium,
di(3,5-di-n-heptylphenyl)magnesium,
methylethylmagnesium,
methylphenylmagnesium,
butylbenzylmagnesium,
triethylaluminum,
tri-n-butylaluminum,
triisobutylaluminum,
tridodecylaluminum,
triphenylaluminum,
tri-1-naphthylaluminum,
tribenzylaluminum,
tri(2-phenylethyl)aluminum,
tri(6-phenylhexyl)aluminum,
tri[6(1-naphthyl)hexyl]aluminum,
tri[9(2-naphthyl)nonyl]aluminum,
tri-2-tolylaluminum,
tri-4-tolylaluminum,
tri(2,4-dimethylphenyl)aluminum,
tri(3-ethylphenyl)aluminum,
tri(2,4-dimethyl-6-ethylphenyl)aluminum,
tri(4-n-butylphenyl)aluminum,
tri(2-n-hexylphenyl)aluminum,
tri(2,4,6-isobutylphenyl)aluminum,
tri(4-dodecylphenyl)aluminum,
tri(2-methyl-1-naphthyl)aluminum,
tri(2,4,5,7-tetraethyl-1-naphthyl)aluminum,
tri(4,5-dipentyl-2-naphthyl)aluminum,
tricyclohexylaluminum,
tricyclopentylaluminum,
methyldicyclohexylaluminum,
tri(4-pentadecylcyclopentyl)aluminum,
tri(4-methylcyclohexyl)aluminum,
tri(2,4-diethylcyclohexyl)aluminum,
tri(3-isobutylcyclohexyl)aluminum,
tri(2,4,6-tri-n-propylcyclohexyl)aluminum,
tri(2-n-propylcyclopentyl)aluminum,
tri(2-cyclohexylethyl)aluminum,
tri(3-cyclopentylbutyl)aluminum,
tri(14-cyclohexyltetradecyl)aluminum and the like.

It is usually prefered to employ a trialkylaluminum, such as triisobutylaluminum, in preparing the catalyst system of this invention.

The organometal hydrides employed in preparing the catalyst system of this invention can be represented by the formula $R_nM'H_m$, wherein R is as defined above, M' is aluminum, gallium, indium or thallium, n and m are integers from 1 to 2, and the sum of n and m is equal to 3. Examples of compounds having the formula $R_nM'H_m$ include dimethylaluminum hydride,
ethylaluminum dihydride,
diisobutylaluminum hydride,
decylaluminum dihydride,
eicosylaluminum dihydride,
cyclopentylaluminum dihydride,
dicyclooctylaluminum hydride,
3-methylcyclohexylaluminum dihydride,
phenylaluminum dihydride,
propylphenylaluminum hydride,
3-cyclohexylpropylaluminum dihydride,
di(4-cycloheptyldecyl)aluminum hydride,
3-phenylbutylaluminum dihydride,
dibenzylaluminum hydride,
2,4-diphenyloctylaluminum dihydride,
2-methylcyclopentylaluminum dihydride,
2-phenylcyclopentylaluminum dihydride,
di(2-methylphenyl)aluminum hydride,
2,4-dibutylphenylaluminum dihydride,
di(2,4-dihexylphenyl)aluminum hydride,
4-cyclobutylphenylaluminum dihydride,
2,4-dicyclopentylphenylaluminum dihydride,
di(2,4-dicyclopentylphenyl)aluminum hydride,
methylgallium dihydride,
diisobutylgallium hydride,
dieicosylgallium hydride,
cyclobutylgallium dihydride,
dicyclohexylgallium hydride,
di(2-naphthyl)gallium hydride,
phenylgallium dihydride,
diphenylgallium hydride,
2-phenylpropylgallium dihydride,
di(4-phenyldecyl)gallium hydride,
2-cyclopentyldodecylgallium dihydride,
3,5-dicyclohexyloctylgallium dihydride,
2,4-dimethylcyclobutylgallium dihydride,
di(3,5-dihexylcyclooctyl)gallium hydride,
2-phenylcyclopentylgallium dihydride,
di(2,4-diphenylcyclooctyl)gallium hydride,
di(2-methylphenyl)gallium hydride,
2,4-di-n-butylphenylgallium dihydride,
2-cyclopentylphenylgallium dihydride,
2,4-dicyclohexylphenylgallium dihydride,
2-naphthylgallium dihydride,
methylindium dihydride,
dibutylindium hydride,
dinonylindium hydride,
cyclopentylindium dihydride,
dicycloheptylindium hydride,
cyclooctylindium dihydride,
phenylindium dihydride,
diphenylindium hydride,
2-cyclobutylpropylindium dihydride,
2,4-dicyclohexyloctylindium dihydride,
benzylindium dihydride,
di(2,4-diphenyloctyl)indium hydride,
2-propylcyclobutylindium dihydride,
2,4-diheptylcyclohexylindium dihydride,
2-phenylcyclobutylindium dihydride,
2,4-diphenylcycloheptylindium dihydride,
di(2-methylphenyl)indium hydride,
2-hexylphenylindium dihydride,
2,4-diheptylphenylindium dihydride,
2-cyclopentylphenylindium dihydride,
di(3-cyclooctyl)phenylindium hydride,
methylthallium dihydride,
pentylthallium dihydride,
eicosylthallium dihydride,
cyclobutylthallium dihydride,
dicyclooctylthallium dihydride,
phenylthallium dihydride,
diphenylthallium hydride,
2-cyclopentylpropylthallium dihydride,
2,4-dicycloheptylhexylthallium dihydride,
dibenzylthallium hydride,
4,6-diphenyloctylthallium dihydride,
2-methylcyclobutylthallium dihydride,
di(2-decylcyclooctyl)thallium hydride,
3-phenylcyclopentylthallium dihydride,
3,5-diphenylcyclooctylthallium dihydride,
2-methylphenylthallium dihydride,
2,4-diheptylphenylthallium dihydride,
3-cyclobutylphenylthallium hydride and
2,4-dicycloheptylphenylthallium dihydride.

Examples of specific catalyst systems that can be employed in the practice of this invention include those prepared by mixing the following components: diethylmagnesium, titanium tetrachloride and the reaction product of diethylaluminum hydride and iodine; di-n-propylmagnesium, titanium tetrachloride and the reaction product of propylaluminum dihydride and iodine; dicyclohexylmagnesium, titanium tetrabromide and the reaction product of diisobutylaluminum hydride and iodine; diphenylmagnesium, titanium tetrachloride and the reaction product of phenylaluminum dihydride and iodine; di-1-naphthylmagnesium, titanium tetrabromide and the reaction product of di(2-naphthyl)aluminum hydride and iodine; di-4-tolylmagnesium, titanium tetrachloride and the reaction product of phenylindium dihydride and iodine; triethylaluminum, titanium tetrachloride and the reaction product of diethylaluminum hydride and iodine; triisobutylaluminum, titanium tetrachloride and the reaction product of diisobutylaluminum hydride and iodine; triphenylaluminum, titanium tetrabromide and the reaction product of phenylindium dihydride and iodine; tri-2-tolylaluminum, titanium tetrabromide and the reaction product of diisopropylgallium hydride and iodine; tribenzylaluminum, titanium tetrabromide and the reaction product of 2-phenylethylgallium dihydride and iodine; tricyclopentylaluminum, titanium tetrachloride and the reaction product of methylthallium dihydride and iodine; tri(2,4-diethylcyclohexyl)aluminum, titanium tetrachloride and the reaction product of 2-cyclopentylpropylthallium dihydride and iodine; and tri(2,4,6-triisobutylphenyl)aluminum, titanium tetrabromide and the reaction product of 2-cyclopentylpropylthallium dihydride and iodine.

The amount of the $R_xM$ compound employed in forming the catalyst is dependent upon whether an organoaluminum or organomagnesium compound is used. When an organoaluminum compound is employed, the mol ratio of the organometal to the titanium tetrachloride or tetrabromide is in the range of 2:1 to 20:1, preferably in the range of 3:1 to 8:1. Also, when used with an organoaluminum compound, the mole ratio of the titanium tetrachloride or tetrabromide to iodine is in the range of 0.1:1 to 4:1, preferably in the range of 0.25:1 to 3:1. When an organomagnesium compound is used, the mol ratio of the organometal to the titanium tetrachloride or tetrabromide is in the range of 0.75:1 to 3:1 and the mol ratio of the titanium tetrachloride or tetrabromide to iodine is in the range of 0.5:1 to 1.25:1. The mol ratio of the organometal hydride to iodine is in the range of 0.5:1 to 5:1 when using an organoaluminum compound. When using an organomagnesium compound, the mol ratio of the organometal hydride to iodine is in the range of 1:1 to 3:1.

The concentration of catalyst employed in the present process can vary over a rather wide range. The catalyst level generally is in the range of 1 to 20 gram millimoles of the organomagnesium or organoaluminum compound per 100 grams of 1,3-butadiene to be polymerized. The actual catalyst level employed will, in general, be determined by the molecular weight of the product which is desired.

The polymerization process of this invention is usually carried out in the presence of a diluent. Diluents suitable for use in the process are hydrocarbons which are nondetrimental to the polymerization reaction. Suitable diluents include aromatics, such as benzene, toluene, the xylenes, ethylbenzene, and mixtures thereof. It is also within the scope of the invention to use straight and branched chain paraffins which contain up to and including 12 carbon atoms per molecule. Examples of paraffins which can be utilized include propane, normal butane, normal pentane, isopentane, normal hexane, isohexane, 2,2,4-triethylpentane (isooctane), normal decane, and the like. Mixtures of these paraffinic hydrocarbons can also be employed as diluents in carrying out the process of this invention. Cycloparaffins, such as cyclohexane and methylcyclohexane, can also be used. Furthermore, mixtures of any of the aforementioned hydrocarbons can be used as diluents. It is usually preferred to carry out the polymerization in the presence of an aromatic hydrocarbon since polymers having the higher cis-contents are produced when operating in this manner.

The polymerization process of this invention can be carried out at temperatures varying over a relatively wide range, e.g., from −100 to 250° F. It is usually preferred to operate at a temperature in the range of −30 to 160° F. The polymerization reaction can be carried out under autogenous pressure or at any suitable pressure sufficient to maintain the reaction mixture substantially in the liquid phase. The pressure will thus depend upon the particular diluent employed and the temperature at which the polymerization is conducted. However, higher pressures can be employed if desired, these pressures being obtained by some such suitable method as the pressurization of the reactor with a gas which is inert with respect to the polymerization reaction. It is to be understood also that it is within the scope of the invention to conduct the polymerization in the solid phase.

The process of this invention can be carried out as a batch process by charging 1,3-butadiene to a reactor containing catalyst and diluent. Although any suitable charging procedure can be used, it is often preferred to add the catalyst components to a reactor containing diluent and 1,3-butadiene. The third component, i.e., the reaction product of the organometal hydride and iodine, used in forming the instant catalyst, is prepared in the presence of a hydrocarbon diluent. It is usually preferred to use the same hydrocarbon which is used for the reaction medium although different hydrocarbons can be employed. The organometal hydride and the free iodine can be brought together at any desired temperature, e.g., at any temperature within the range employed in the polymerization. A reaction occurs instantaneously when the two materials are mixed as evidenced by the disappearance in color of the iodine. The reaction product so obtained is then ready for introduction into the reactor. It is to be understood that it is within the scope of the invention to preform the catalyst by mixing the catalyst components within a separate catalyst preparation vessel. The resulting material can then be charged to the reactor containing monomer and diluent or these latter materials can be added after the catalyst. The process can also be carried out continuously by maintaining the above-mentioned concentrations of reactants in the reactor for a suitable residence time. The residence time in a continuous process will, of course, vary within rather wide limits, depending upon such variables as temperature, pressure, the ratio of catalyst components and the catalyst concentration. In a continuous process the residence time usually falls within the range of one second to ten hours when conditions within the specified ranges are employed. When a batch process is being utilized, the time for the reaction can be as high as 24 hours or more.

Various materials are known to be detrimental to the catalyst composition of this invention. These materials include carbon dioxide, oxygen and water. It is usually desirable, therefore, that the butadiene be freed of these materials as well as other materials which may tend to inactivate the catalyst. Any of the known means for removing such contaminant can be used. Furthermore, when a diluent is employed in the process, it is preferred that this material be substantially free of impurities such as water, oxygen and the like. In this connection, it is desirable to remove air and moisture from the reaction vessel in which the polymerization is to be conducted. Although it is preferred to carry out the polymerization under anhydrous or substantially anhydrous conditions, it is to be understood that small amounts of these catalyst-inactivating materials can be tolerated in the reaction mixture. However, it is also to be understood that the amount of such materials which can be tolerated is insufficient to cause complete deactivation of the catalyst.

Upon completion of the polymerization reaction, when a batch process is used, the total reaction mixture is then treated to inactivate the catalyst and recover the rubbery product. Any suitable method can be utilized in carrying out this treatment of the reaction mixture. In one method, the polymer is recovered by steam stripping the diluent from the polymer. In another suitable method, a catalyst-inactivating material, such as an alcohol, is added to the mixture so as to inactivate the catalyst and cause precipitation of the polymer. The polymer is then separated from the alcohol and diluent by any suitable method, such as by decantation or filtration. It is often preferred to add initially only an amount of the catalyst-inactivating material which is sufficient to inactivate the catalyst without causing precipitation of the dissolved polymer. It has also been found to be advantageous to add an antioxidant, such as 2,2′-methylene-bis(4-methyl-6-tert-butylphenol), to the polymer solution prior to the recovery of the polymer. After addition of the catalyst-inactivating material and the antioxidant, the polymer present in the solution can then be separated by addition of an excess of a material, such as ethyl alcohol or isopropyl alcohol. When the process is carried out continuously, the total effluent can be pumped from the reactor to a catalyst-inactivating zone wherein the reactor effluent is contacted with a suitable catalyst-inactivating material such as an alcohol. When an alcohol is used as a catalyst-inactivating material, it also functions to precipitate the polymer. In the event catalyst-inactivating materials are employed which do not perform this dual role, a suitable material, such as an alcohol, can be added to precipitate the polymer. It is, of course, to be realized that it is within the scope of the invention to employ other suitable methods to recover the polymer from solution. After separation from the water or alcohol and diluent by filtration or other suitable means, the polymer is then dried.

The polymers produced in accordance with this invention are rubbery polymers. The polymers can be compounded by the various methods that have been used in the past for compounding natural and synthetic rubbers. Vulcanization accelerators, vulcanizing agents, reinforcing agents, and fillers such as have been used in natural and synthetic rubbers can likewise be used in compounding the rubber of this invention. It is also within the scope of the invention to blend the polymers with other polymeric materials, such as natural rubber, cis 1,4-polyisoprene, polyethylene, and the like. As mentioned hereinbefore, the polymers of this invention have a very high cis-content which renders them very suitable for applications requiring low hysteresis, high resilience, and low freeze point. In general, the polymers have utility in application when natural and synthetic rubbers are used. They are particularly useful in the manufacture of automobile and truck tires and other rubbery articles, such as gaskets.

A more comprehensive understanding of the invention can be obtained by referring to the following illustrative example which is not intended, however, to be unduly limitative of the invention.

In the structural analyses of the polymer products described hereinafter, a sample of the polymer to be tested was dissolved in carbon disulfide to form a solution having 25 grams of polymer per liter of solution. The infrared spectrum of the solution (percent transmission) was then determined in a commercial infrared spectrometer.

The percent of the total unsaturation present as trans 1,4 was calculated according to the following equation and consistent units:

$$\epsilon = \frac{E}{tc}$$

where $\epsilon$=extinction coefficient (liters-mols$^{-1}$-centimeters$^{-1}$); $E$=extinction (log $I_0/I$); $t$=path length (centimeters); and $c$=concentration (mols double bond/liter). The extinction was determined at the 10.35 micron band and the extinction coefficient was 146 (liters-mols$^{-1}$-centimeters$^{-1}$).

The percent of the total unsaturation present as 1,2 (or vinyl) was calculated according to the above equation, using the 11.0 micron band and an extinction coefficient of 209 (liters-mols$^{-1}$-centimeters$^{-1}$).

The percent of the total unsaturation present as cis 1,4 was obtained by subtracting the trans 1,4- and 1,2-vinyl) determined according to the above procedure from the theoretical unsaturation, assuming one double bond per each C$_4$ unit in the polymer.

The inherent viscosities of the polymerization products were determined by placing one tenth gram of polymer in a wire cage made from 80 mesh screen and placing the wire cage in 100 ml. of toluene contained in a widemouth, 4-ounce bottle. After standing at room temperature (approximately 25° C.) for 24 hours, the cage was removed and the solution was filtered through a sulfur absorption tube of grade C porosity to remove any solid particles present. The resulting solution was run through a Medalia-type viscometer supported in a 25° C. bath. The viscometer was previously calibrated with toluene. The relative viscosity is the ratio of the viscosity of the polymer solution to that of toluene. The inherent viscosity calculated by dividing the natural logarithm of the relative viscosity by the weight of the soluble portion of the original sample.

*Example*

Two series of runs were made in which 1,3-butadiene was polymerized, using a catalyst system formed by mixing triisobutylaluminum (TBA), titanium tetrachloride and an iodine solution. In one series of runs the iodine solution was prepared by mixing toluene, diisobutylaluminum hydride (DBAH), and iodine, the hydride and iodine being used in a 2:1 mol ratio. In the other series of runs the iodine solution was prepared by mixing toluene, triisobutylaluminum, and iodine, the organoaluminum compound and iodine being used in a 2:1 mol ratio. The polymerization recipe was as follows:

| | |
|---|---|
| 1,3-butadiene, parts by weight | 100 |
| Toluene, parts by weight | 1200 |
| Aluminum level,[1] mhm.[2] | 2.86 |
| Iodine level, mhm | Variable |
| Titanium tetrachloride (TTC), mhm.[2] | 0.357 |
| Temperature, ° C. | 5 |
| Time, hours | 2 |

[1] Included triisobutylaluminum plus aluminum charged in iodine solution, either as triisobutylaluminum or diisobutylaluminum hydride.
[2] Millimoles per 100 grams monomer.

In each run toluene was charged initially, after which the reactor was purged with nitrogen and butadiene was added. Triisobutylaluminum was then introduced followed by the iodine solution and the titanium tetrachloride. At the close of the polymerization, the reaction was shortstopped with two parts by weight per 100 parts of monomer of 2,2'-methylene-bis(4-methyl - 6 - tert-butylphenol) dissolved in a mixture of equal volume of isopropyl alcohol and toluene. The polymer was coagulated in isopropyl alcohol, separated, and dried. The following table gives a summary of the runs:

TABLE

| | 1 | 2 | 3 | 4 | 5 | 6 | 7 | 8 |
|---|---|---|---|---|---|---|---|---|
| Iodine, mhm | 0.178 | 0.268 | 0.357 | 0.714 | 0.178 | 0.357 | 0.535 | 0.714 |
| DBAH, mhm | 0.356 | 0.536 | 0.714 | 1.428 | | | | |
| TBA, mhm | 2.51 | 2.33 | 2.16 | 1.44 | [1] 2.51 | [1] 2.16 | [1] 1.80 | [1] 1.44 |
| Mol Ratios: | | | | | | | | |
| Al/I$^2$/TTC | 8/0.5/1 | 8/0.75/1 | 8/1/1 | 8/2/1 | 8/0.5/1 | 8/1/1 | 8/1.5/1 | 8/2/1 |
| DBAH/TTC | 1/1 | 1.5/1 | 2/1 | 4/1 | | | | |
| TTC/I$^2$ | 2/1 | 1.3/1 | 1/1 | 0.5/1 | 2/1 | 1/1 | 0.67/1 | 0.5/1 |
| Conversion, percent | 17 | 50 | 70 | 92 | Trace | 20 | 60 | 77 |
| Inherent Viscosity | | 1.95 | 3.05 | 4.43 | | | 2.52 | 3.18 |
| Microstructure, percent: | | | | | | | | |
| Cis | | | 95.6 | | | | | 95.6 |
| Trans | | | 1.2 | | | | | 1.4 |
| Vinyl | | | 3.2 | | | | | 3.0 |

[1] In addition to what was charged in the iodine solution.

The data show that only half as much iodine was needed in run 3 to give a result similar to that obtained in run 8. A comparison of the first four runs with the last four shows that at a given iodine level, a higher conversion is obtained in the systems in which diisobutylaluminum hydride was used.

As will be evident to those skilled in the art, many variations and modifications of this invention can be practiced in view of the foregoing disclosure. Such variations and modifications are believed to come within the spirit and scope of the invention.

I claim:
1. A process for polymerizing 1,3-butadiene, to produce a cis-polybutadiene, which comprises contacting 1,3-butadiene under polymerization conditions with a catalyst formed by mixing materials comprising (a) an organometal compound having the formula R$_x$M, wherein R is selected from the group consisting of alkyl, cycloalkyl, aryl and combinations of these radicals, M is a metal selected from the group consisting of magnesium and aluminum, and $x$ is an integer equal to the valence of the metal M, (b) a titanium halide selected from the group consisting of titanium tetrachloride and titanium tetrabromide, and (c) the reaction product obtained by mixing (1) an organometal hydride having the formula R$_n$M'H$_m$, wherein R is as defined above, M' is a metal selected from the group consisting of aluminum, gallium, indium and thallium, $n$ and $m$ are integers from 1 to 2, and the sum of $n$ and $m$ is equal to 3, and (2) elemental iodine, when said R$_x$M compound is an organomagnesium compound, the mol ratio of said R$_x$M compound to said titanium halide is in the range of 0.75:1 to 3:1, the mol ratio of said titanium halide to iodine is in the range of 0.5:1 to 1.25:1, and the mol ratio of said organometal hydride to iodine is in the range of 1:1 to 3:1; and, when said R$_x$M compound is an organoaluminum compound, the mol ratio of said R$_x$M compound to said titanium halide is in the range of 2:1 to 20:1, the mol ratio of said titanium halide to iodine is in the range of 0.1:1 to 4:1, and the mol ratio of said organometal hydride to iodine is in the range of 0.5:1 to 5:1.

2. A process according to claim 1 in which said catalyst is formed by mixing materials consisting essentially of (a) triisobutylaluminum, (b) titanium tetrachloride, and (c) the reaction product obtained by mixing diisobutylaluminum hydride and elemental iodine.

3. A process according to claim 1 in which said catalyst is formed by mixing materials consisting essentially of (a) diethylmagnesium, (b) titanium tetrachloride, and (c) the reaction product obtained by mixing diisobutylaluminum hydride and elemental iodine.

4. A process according to claim 1 in which said catalyst is formed by mixing materials consisting essentially of (a) triphenylaluminum, (b) titanium tetrabromide and (c) the reaction product obtained by mixing diisobutylaluminum hydride and elemental iodine.

5. A process according to claim 1 in which said catalyst is formed by mixing materials consisting essentially of (a) triethylaluminum, (b) titanium tetrachloride, and (c) the reaction product obtained by mixing diethylaluminum hydride and elemental iodine.

6. The process according to claim 1 in which said catalyst is formed by mixing materials consisting sesentially of (a) triphenylaluminum, (b) titanium tetrabromide, and (c) the reaction product obtained by mixing phenylindium dihydride and elemental iodine.

7. A process for polymerizing 1,3-butadiene which comprises contacting 1,3-butadiene with a catalyst formed by mixing materials comprising (a) an organometal compound having the formula $R_xM$, wherein R is selected from the group consisting of alkyl, cycloalkyl, aryl and combinations of these radicals, M is a metal selected from the group consisting of magnesium and aluminum, and $x$ is an integer equal to the valence of the metal M, (b) a titanium halide selected from the group consisting of titanium tetrachloride and titanium tetrabromide, and (c) the reaction product obtained by mixing (1) an organometal hydride having the formula $R_nM'H_m$, wherein R is as defined above, M' is a metal selected from the group consisting of aluminum, gallium, indium and thallium, $n$ and $m$ are integers from 1 to 2, and the sum of $n$ and $m$ is equal to 3, and (2) elemental iodine, when said $R_xM$ compound is an organomagnesium compound, the mol ratio of said $R_xM$ compound to said titanium halide is in the range of 0.75:1 to 3:1, the mol ratio of said titanium halide to iodine is in the range of 0.5:1 to 1.25:1, and the mol ratio of said organometal hydride to iodine is in the range of 1:1 to 3:1; and, when said $R_xM$ compound is an organoaluminum compound, the mol ratio of said $R_xM$ compound to said titanium halide is in the range of 2:1 to 20:1, the mol ratio of said titanium halide to iodine is in the range of 0.1:1 to 4:1, and the mol ratio of said organometal hydride to iodine is in the range of 0.5:1 to 5:1, said contacting occurring in the presence of a hydrocarbon diluent at a temperature in the range of −100 to 250° F. and under autogenous pressure; and recovering a rubbery cis-polybutadiene so produced.

8. A process for preparing a cis-polybutadiene which comprises contacting 1,3-butadiene with a catalyst formed by mixing materials consisting essentially of (a) triisobutylaluminum, (b) titanium tetrachloride, and (c) the reaction product obtained by mixing diisobutylaluminum hydride and elemental iodine, the mol ratio of said triisobutylaluminum to said titanium tetrachloride being in the range of 2:1 to 20:1, the mol ratio of said titanium tetrachloride to said iodine being in the range of 0.1:1 to 4:1, and the mol ratio of said diisobutylaluminum hydride to said iodine being in the range of 0.5:1 to 5:1, said contacting occurring in the presence of a hydrocarbon diluent at a temperature in the range of −30 to 160° F. and under autogenous pressure; and recovering the cis-polybutadiene so produced.

9. A catalyst composition formed by mixing materials comprising (a) an organometal compound having the formula $R_xM$, wherein R is selected from the group consisting of alkyl, cycloalkyl, aryl and combinations of these radicals, M is a metal selected from the group consisting of magnesium and aluminum, and $x$ is an integer equal to the valence of the metal M, (b) a titanium halide selected from the group consisting of titanium tetrachloride and titanium tetrabromide, and (c) the reaction product obtained by mixing (1) an organometal hydride having the formula $R_nM'H_m$, wherein R is as defined above, M' is a metal selected from the group consisting of aluminum, gallium, indium, and thallium, $n$ and $m$ are integers from 1 to 2, and the sum of $n$ and $m$ is equal to 3, and (2) elemental iodine, when said $R_xM$ compound is an organomagnesium compound, the mol ratio of said $R_xM$ compound to said titanium halide is in the range of 0.75:1 to 3:1, the mol ratio of said titanium halide to iodine is in the range of 0.5:1 to 1.25:1, and the mol ratio of said organometal hydride to iodine is in the range of 1:1 to 3:1; and, when said $R_xM$ compound is an organoaluminum compound, the mol ratio of said $R_xM$ compound to said titanium halide is in the range of 2:1 to 20:1, the mol ratio of said titanium halide to iodine is in the range of 0.1:1 to 4:1, and the mol ratio of said organometal hydride to iodine is in the range of 0.5:1 to 5:1.

10. A catalyst composition formed by mixing materials consisting essentially of (a) triisobutylaluminum, (b) titanium tetrachloride, and (c) the reaction product obtained by mixing diisobutylaluminum hydride and elemental iodine.

11. A catalyst composition formed by mixing materials consisting essentially of (a) diethylmagnesium, (b) titanium tetrachloride, and (c) the reaction product obtained by mixing diisobutylaluminum hydride and elemental iodine.

12. A catalyst composition formed by mixing materials consisting essentially of (a) triphenylaluminum, (b) titanium tetrabromide, and (c) the reaction product obtained by mixing diisobutylaluminum hydride and elemental iodine.

13. A catalyst composition formed by mixing materials consisting essentially of (a) triethylaluminum, (b) titanium tetrachloride, and (c) the reaction product obtained by mixing diethylaluminum hydride and elemental iodine.

14. A catalyst composition formed by mixing materials consisting essentially of (a) triphenylaluminum, (b) titanium tetrabromide, and (c) the reaction product obtained by mixing phenylindium dihydride and elemental iodine.

References Cited

UNITED STATES PATENTS

| | | | |
|---|---|---|---|
| 3,099,648 | 7/1963 | Dye | 260—94.3 |
| 3,182,052 | 5/1965 | Naylor | 260—94.3 |
| 3,172,881 | 3/1965 | Farrar | 260—94.3 |

FOREIGN PATENTS

| | | |
|---|---|---|
| 628,151 | 9/1961 | Canada. |
| 1,256,231 | 2/1961 | France. |

OTHER REFERENCES

Zeiss, Organometallic Chemistry, Reinhold, New York, 1961, pages 236–238, QD 411 Z4.

Zakharkin et al., Bull. Acad. Sci. U.S.S.R., Div. of Chem. Soc., 1959, pages 151–153. Copy in Group 110 (260–448 A).

Bartkiewiez et al., Analytica Chimica Acta, vol. 20 (1959), pages 326–329, QD 71 A47.

Gippin, ACS Preprints, vol. 6, No. 4, September 1961, pages A–25 to A–42, page A–25 relied on, TP690. AlA5a copy in Group 140.

JOSEPH L. SCHOFER, *Primary Examiner.*

JAMES A. SEIDLECK, E. J. SMITH, W. HOOVER, L. EDELMAN, *Assistant Examiners.*